(12) United States Patent
Kaneshiro et al.

(10) Patent No.: US 7,416,695 B2
(45) Date of Patent: Aug. 26, 2008

(54) SEMICONDUCTIVE POLYMIDE FILM AND PROCESS FOR PRODUCTION THEREOF

(75) Inventors: Hisayasu Kaneshiro, Uji (JP); Yasushi Nishikawa, Otsu (JP); Kiyokazu Akahori, Otsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/479,543

(22) PCT Filed: Jun. 14, 2002

(86) PCT No.: PCT/JP02/05947

§ 371 (c)(1),
(2), (4) Date: Dec. 3, 2003

(87) PCT Pub. No.: WO02/102882

PCT Pub. Date: Dec. 27, 2002

(65) Prior Publication Data

US 2004/0151928 A1 Aug. 5, 2004

(30) Foreign Application Priority Data

| Jun. 15, 2001 | (JP) | ............... 2001-182631 |
| Jun. 19, 2001 | (JP) | ............... 2001-185480 |
| Jul. 6, 2001 | (JP) | ............... 2001-206424 |
| Aug. 3, 2001 | (JP) | ............... 2001-237063 |

(51) Int. Cl.
*B29C 35/02* (2006.01)
*B28B 5/00* (2006.01)
*C07C 37/20* (2006.01)

(52) U.S. Cl. ............ 264/494; 264/241; 524/350

(58) Field of Classification Search ............ 428/473.5; 427/331, 335, 372.2; 264/241, 494; 524/91, 524/334, 350
See application file for complete search history.

(56) References Cited

U.S. PATENT DOCUMENTS

| 4,557,860 | A | * | 12/1985 | DiSalvo et al. ............ 252/512 |
| 5,406,124 | A | * | 4/1995 | Morita et al. ............ 257/783 |
| 5,582,886 | A | | 12/1996 | Kitajima et al. |
| 5,759,655 | A | | 6/1998 | Kitajima et al. |
| 5,837,767 | A | * | 11/1998 | Shimokusuzuno et al. .. 524/497 |
| 5,906,886 | A | * | 5/1999 | Yamaguchi ............ 428/215 |
| 6,207,739 | B1 | * | 3/2001 | Ono et al. ............ 524/218 |
| 7,018,704 | B2 | * | 3/2006 | Kaneshiro et al. ............ 428/209 |

FOREIGN PATENT DOCUMENTS

| EP | 0653297 A2 | 5/1995 |
| EP | 1075925 A1 | 2/2001 |
| JP | 01-146957 | 6/1989 |
| JP | 07-178741 | 7/1995 |
| JP | 07-331450 | 12/1995 |
| JP | 08-227614 | 9/1996 |
| JP | 08-259709 | 10/1996 |
| JP | 08-259810 | 10/1996 |
| JP | 08-295513 | 11/1996 |
| JP | 09-286936 | 11/1997 |
| JP | 11-116825 | 4/1999 |
| JP | 11-202648 | 7/1999 |
| JP | 11-279437 | 10/1999 |
| JP | 2000-207959 | 9/2000 |
| JP | 2001-002954 | 1/2001 |
| JP | 2001-047451 | 2/2001 |
| JP | 2001-131410 | 5/2001 |
| JP | 2001-142313 | 5/2001 |

\* cited by examiner

*Primary Examiner*—Thao T. Tran
(74) *Attorney, Agent, or Firm*—Hogan & Hartson LLP

(57) ABSTRACT

A polyamide acid solution and/or gel film is subjected to at least any one of the following processes: addition of a semiconducting inorganic filler, addition of a conductivity imparting agent, and formation of a conductive film. Thereafter, the polyamide acid contained in the polyamide acid solution or gel film is imidized. Thus, the obtained semiconducting polyimide film has surface and volume resistances satisfactorily controllable and less dependent on voltage, excellent mechanical properties, and a high elongation rate.

7 Claims, No Drawings

SEMICONDUCTIVE POLYIMIDE FILM AND PROCESS FOR PRODUCTION THEREOF

TECHNICAL FILED

The present invention relates to semiconducting polyimide film, and its manufacturing method, which is suitably used as a battery electrode material, electromagnetic shield material, electrostatic attracting film, antistatic agent, and image forming apparatus component, in an electronics device, and other purposes.

BACKGROUND ART

A conventionally known method of improving the conductivity of polyimide is to mix a conductive filler in the polyimide (for convenience, the method will be referred to as "method I"). The "conductive filler," or simply "filler," is typically one of a variety of base materials coated with carbon, graphite, metal particles, indium tin oxide, or another conductive material to provide conductivity.

Improvement of conductivity by method I, however, raises following problems. First, most polyimide films obtained are of inferior mechanical properties. Next, conductive fillers (filler) obtained by method I show a very low resistivity (no more than about $10^3$ Ω·cm in resistance) and present extreme difficulties in controlling the resistance value in the semiconducting region. Especially, the fillers are difficult to enhance reproducibility of surface resistivity and volume resistivity and reduce their in-plane irregularities. Also, polyimide films obtained by method I show a resistivity which has relatively large dependence on measurement voltage.

As a similar technique, Japanese Unexamined Patent Application 1-146957/1989 (Tokukaihei 1-146957; published on 8 Jun. 1989) discloses a resin composition filled with metal oxide fine powder (filler) and carbon black (for convenience, the technique will be referred to as "method II").

Method II however is designed specifically to manufacture a semiconducting resin composition suitable for a sleeve of a developing roll for use in electronic photographic image forming apparatus of a single component developing system. In other words, the technique aims to obtain a semiconducting resin composition which exhibits desirable properties as a sleeve. Such properties are hard to achieve using either one of a highly conductive filler or carbon black; both of them are therefore used.

In fact, in method II, emphasis is only on adjustment of the volume resistance, which makes it difficult to properly adjust the surface resistance when a film is made of the resin. When method II is applied to a polyimide film, the resultant polyimide film has poor surface resistivity reproducibility as was the case with method I.

As a technique successfully addressing problems of these methods, for example, Japanese Unexamined Patent Applications 8-259810/1996 (Tokukaihei 8-259810; published on 8 Oct. 1996) and 8-259709/1996 (Tokukaihei 8-259709; published on 8 Oct. 1996) disclose a method whereby polyaniline is polymer-blended with polyimide to impart conductivity (for convenience, the method will be referred to as "method III").

Method III have following problems. First, polyaniline's conductivity is ion conductivity, and its resistance value therefore is largely susceptible to environmental conditions. In addition, polyaniline has yet to establish industrially sufficient manufacturing productivity and is very costly to use as a polymer blend.

Apart from method III, for example, Japanese Unexamined Patent Applications 11-279437/1999 (Tokukaihei 11-279437; published on 12 Oct. 1999), 2000-207959 (Tokukai 2000-207959; published on 28 Jul. 2000), and 2001-2954 (Tokukai 2001-2954; published on 9 Jan. 2001) discloses preparation and use of a coating liquid in the formation of a conductive metal oxide film on a non-conductive base to provide conductivity (for convenience, will be referred to as "method IV").

Method IV however only forms a conductive film on the base surface and is unable to reduce the base's volume resistance.

These conventional methods thus present difficulties in precisely controlling the surface and volume resistance of the polyimide film, making resistance less dependent on voltage, and enhancing its elongation rate and mechanical properties.

DISCLOSURE OF THE INVENTION

The inventors of the present invention have diligently worked to offer a polyimide film which successfully addresses the aforementioned conventional problems, allows good control over surface resistance and volume resistance and reduction in voltage dependence of the surface and volume resistance, boasts excellent mechanical properties, and achieves a high elongation rate, to the completion of the present invention.

In order to solve the foregoing problems, a semiconducting polyimide film in accordance with the present invention is prepared by, at least: subjecting a polyamide acid solution and/or a gel film to any one of the steps of adding a semiconducting inorganic filler, adding a conductivity imparting agent, and forming a conductive film, where the polyamide acid solution is a solution of polyamide acid in an organic solvent, and the gel film is a film prepared by partially hardening and/or partially drying the polyamide acid; and subsequently imidizing the polyamide acid contained in the polyamide acid solution or the gel film, wherein the semiconducting polyimide film has a surface resistance between $10^8$ Ω/☐ and $10^{13}$ Ω/☐ and a volume resistance between $10^8$ Ωcm and $10^{14}$ Ωcm as measured at an applied voltage of 100 V.

In order to solve the foregoing problems, a method of manufacturing a semiconducting polyimide film in accordance with the present invention, includes: the conductivity imparting step in which a polyamide acid solution and/or a gel film is subjected to any one of the steps of adding a semiconducting inorganic filler, adding a conductivity imparting agent, and forming a conductive film, where the polyamide acid solution is a solution of polyamide acid in an organic solvent, and the gel film is a film prepared by partially hardening and/or partially drying the polyamide acid; and the post-conductivity-imparting imidization step, following the conductivity imparting step, in which the polyamide acid contained in the polyamide acid solution or the gel film is imidized.

Specifically, a semiconducting polyimide film in accordance with the present invention essentially is a polyimide film includes a polyimide and a semiconducting inorganic filler at a weight ratio of 85:15 to 50:50 (in other words, 15-50 wt % semiconducting inorganic filler), and has a surface resistance between $10^{10}$ Ω/☐ and $10^{13}$ Ω/☐ and a volume resistance between $10^{10}$ Ωcm to $10^{14}$ Ωcm as measured at an applied voltage of 100 V.

A method of manufacturing a semiconducting polyimide film in accordance with the present invention is a method including any one of the following sets of steps: The first set includes the steps of preparing a polyamide acid solution containing a semiconducting inorganic filler by polymerization in a slurry in which the semiconducting inorganic filler is uniformly dispersed, forming a film by flow-casting a film-forming solution containing that solution on a base member, and thermally or chemically imidizing the film. The second set includes the steps of mixing a polyamide acid solution and a slurry in which the semiconducting inorganic filler is uniformly dispersed, forming a film by flow-casting that liquid mixture on a base member, and thermally or chemically imidize the film. The third set includes the steps of directly dispersing the semiconducting inorganic filler in a polyamide acid solution, forming a film by flow-casting that liquid mixture on a base member, and thermally or chemically imidizing the film.

According to the arrangement or method, a semiconducting polyimide film is manufactured with (i) resistance in the semiconducting region which is less dependent on measurement voltage, (ii) a surface resistance and volume resistance which are precisely and readily controllable, and (iii) excellent mechanical strength.

Further, a method of manufacturing a semiconducting polyimide film in accordance with the present invention may be a method including the steps of immersing the partially hardened and/or partially dried gel film in, and/or coating that gel film with, a coating liquid for formation of a conductive metal oxide film, and subsequently imidizing remaining amide acid and drying that film. In the method, the gel film may include the semiconducting inorganic filler.

A semiconducting polyimide film in accordance with the present invention, obtained by the aforementioned manufacturing method, has a surface resistance between $10^8$ $\Omega/\square$ and $10^{12}$ $\Omega/\square$ and a volume resistance between $10^8$ $\Omega$cm and $10^{13}$ $\Omega$cm as measured at an applied voltage of 100 V.

Alternatively, a method of manufacturing a semiconducting polyimide film in accordance with the present invention may be a method including the steps of: flow-casting on a support body a film-forming solution containing an organic solution of polyamide acid in an organic solvent and a coating liquid for formation of a conductive metal oxide film; and subsequently imidizing and drying. In the method, the gel film may contain a semiconducting inorganic filler.

According to the arrangement or method, the volume and surface resistance values are precisely and readily controllable in the semiconducting region. In addition, the resultant semiconducting polyimide film has the resistance values which are less dependent on voltage and less irregular on the film in-plane.

For a fuller understanding of the nature and advantages of the invention, reference should be made to the ensuing detailed description taken in conjunction with the accompanying drawings.

BEST MODE FOR CARRYING OUT THE INVENTION

The following will describe an embodiment in detail in accordance with the present invention, which is by no means limiting the scope of the present invention.

A semiconducting polyimide film in accordance with the present invention is obtained by a manufacturing method involving a conductivity imparting step and a post-conductivity-imparting imidization step, wherein the semiconducting polyimide film has a surface resistance between $10^8$ $\Omega/\square$ and $10^{13}$ $\Omega/\square$ and a volume resistance between $10^8$ $\Omega$cm and $10^{14}$ $\Omega$cm as measured at an applied voltage of 100 V.

A method of manufacturing a semiconducting polyimide film in accordance with the present invention is a method involving the aforementioned conductivity imparting step and post-conductivity-imparting imidization step.

The conductivity imparting step is a step of adding a semiconducting inorganic filler to, adding a conductivity imparting agent to, or forming a conductive film from, subjecting a solution of polyamide acid in an organic solvent (hereinafter, for convenience, "polyamide acid solution") and/or a gel film. The aforementioned post-conductivity-imparting imidization step is a step of, after the conductivity imparting step, imidizing the polyamide acid contained in the polyamide acid solution or gel film.

Now, the semiconducting polyimide film and the manufacturing method thereof in accordance with the present invention will be described in detail according to the manufacturing process of the semiconducting polyimide film.

In the conductivity imparting step, a polyamide acid solution and/or a gel film is provided with conductivity by various methods. Therefore, the manufacturing method in accordance with the present invention may involve the aforementioned polyamide acid solution preparation step and/or the gel film formation step.

<Polyamide Acid Solution Preparation Step>

Basically, the semiconducting polyimide film in accordance with the present invention is manufactured by a conventional, publicly available method except for the aforementioned conductivity imparting step and post-conductivity-imparting imidization step. Therefore, the polyimide used in the present invention is obtained by first manufacturing a polyamide acid which is a precursor of that polyimide and subsequently imidizing the polyamide acid. The present invention therefore preferably involves a polyamide acid solution preparation step.

The polyamide acid used in the present invention is normally manufactured by: dissolving at least one type of aromatic dianhydride and at least one type of diamine in an organic solvent so that the obtained polyamide acid solution contains substantially equal moles of the dianhydride and the diamine; and agitating the polyamide acid solution under controlled temperature environment until the polymerization of the dianhydride and the diamine completes. In the present invention, any kind of polymerization may be employed to obtain the polyamide acid solution. Here are three such examples:

1) The aromatic dianhydride in a solid, slurry, or solution form or in a combination of these forms is added to the organic solvent in which the diamine is already dissolved or dispersed.

2) The diamine in a solid, slurry, or solution form or in a combination of these forms is added to the solvent in which the aromatic dianhydride is already dissolved or dispersed.

3) Each monomer is added in a graduated manner for the purpose of controlling the sequence of the polyamide acid molecules, and finally, substantially equal moles of the aromatic dianhydride and the diamine are reacted.

A further alternative is to mix two or more polyamide acid solutions individually polymerized. The concentration and viscosity of the polyamide acid solution may be properly adjusted in light of usage and process. Typically, the obtained solution has a concentration ranging from 5 wt % to 35 wt %, preferably 10 wt % to 30 wt %, and a viscosity ranging from 50 poises to 10000 poises, preferably 100 poises to 5000 poises, as measured at 23 degrees C. A suitable molecular weight is mostly attained if the concentration and the solution viscosity are in those ranges.

The polyamide acid solution is normally obtained at a 10 wt % to 30 wt % concentration. With the concentration in this range, a suitable molecular weight and a solution viscosity for imidization is obtained. This does not of course limit the polyamide acid solution preparation step of the present invention by any means; a polyamide acid composition in solution form may be prepared by another method involving a polyamide acid.

Aromatic dianhydrides usable for the manufacture of the polyamide acid are not limited in any particular manner. Specific examples of preferred aromatic dianhydrides include pyromellitic dianhydride, 2,3,6,7-naphthalene tetracarboxylic dianhydride, 3,3',4,4'-biphenyl tetracarboxylic dianhydride, 1,2,5,6-naphthalene tetracarboxylic dianhydride, 2,2', 3,3'-biphenyl tetracarboxylic dianhydride, 3,3',4,4'-benzophenone tetracarboxylic dianhydride, 2,2-bis(3,4-dicarboxyphenyl)propane dianhydride, 3,4,9,10-perylene tetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoesteric anhydride), ethylene bis(trimellitic monoesteric anhydride), bisphenol A bis(trimellitic monoesteric anhydride), and the like. Any one of the aromatic dianhydrides may be used singly; alternatively, two or more of them may be mixed for use as a mixture at any ratio.

Especially preferred compounds among the listed aromatic dianhydrides are pyromellitic dianhydride, 3,3',4,4'-benzophenone tetracarboxylic dianhydride, 3,3',4,4'-biphenyl tetracarboxylic dianhydride, and p-phenylene bis(trimellitic monoesteric anhydride). These compounds may also be used alone or as a mixture.

Diamines usable for the manufacture of the polyamide acid are not limited in any particular manner. Specific examples of preferred diamines include 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenylether, 3,3'-diaminodiphenylether, 3,4'-diaminodiphenylether, 1,5-diaminonaphthalene, 4,4'-diaminodiphenyldiethyl silane, 4,4'-diaminodiphenylsilane, 4,4'-diaminodiphenylethyl phosphine oxide, 4,4'-diaminodiphenyl N-methylamine, 4,4'-diaminodiphenyl N-phenylamine, 1,4-diaminobenzene(p-phenylene diamine), 1,3-diaminobenzene, 1,2-diaminobenzene, and the like. Any of the diamines may be used singly; alternatively, two or more of them may be mixed for use as a mixture at any ratio.

Especially preferred compounds among the listed diamines are 4,4'-diaminodiphenylether and p-phenylene diamine. One of these compounds may be used singly; alternatively, they may be mixed for use as a preferred mixture at a mole ratio ranging from 90:10 to 10:90, preferably from 85:15 to 20:80, more preferably 80:20 to 30:70.

Organic solvents usable for the synthesis of the polyamide acid are not limited in any particular manner. Specific examples of preferred organic solvents include N,N-dimethylformamide, N,N-dimethylacetamide, N-methyl-2-pyrolidone, and other amide solvents. Any of the organic solvents may be used singly; alternatively, two or more of them may be mixed for use as a mixture at any ratio.

Especially preferred ones among the listed organic solvents are N,N-dimethylformamide and N,N-dimethylacetamide. One of these solvents may be used alone or as a mixture.

Preparation conditions in the polyamide acid solution preparation step of the present invention, that is, conditions under which the polyamide acid solution is manufactured, are not limited in any particular manner. Specifically, the composition of the aforementioned monomer solution prepared for the polymerization of the polyamide acid, temperature controlled for the polymerization of the polyamide acid, the order in which the monomers are added, conditions under which the monomer solution is agitated, etc. are appropriately such that a desired polyamide acid solution can be synthesized. Conventional, publicly known conditions are suitably applicable.

<Gel Film Formation Step>

In the present invention, a conductivity imparting step is carried out on the aforementioned polyamide acid solution or gel film. Therefore, the present invention may involve a gel film formation step in which to form the aforementioned gel film.

The gel film formed in the gel film formation step refers to a film made by partially hardening and/or partially dried polyamide acid, and is manufacturable by a conventional, publicly available method. Specifically, for example, the gel film is obtainable by flow-casting and applying a polyamide acid solution obtained in the polyamide acid solution preparation step on a support body and chemically or thermally hardening it.

Chemical hardening is preferred, because the method facilitates averting diluted physical properties, such as toughness and breaking strength, and decreased productivity of the semiconducting polyimide film as a final product. Needless to say, in some situations, thermal hardening can be suitably used too, depending on the usage, type, and other conditions of semiconducting polyimide film and gel film.

The hardening above refers specifically to the imidization of a polyamide acid. For the imidization, either thermal curing or chemical curing, or both methods is/are used. Thermal curing corresponds to the aforementioned method of thermal hardening, and chemical curing corresponds to the aforementioned method of chemical hardening.

Thermal curing is a method of causing imidization reaction to progress only by heating, without using dehydrating ring-closing agents and other chemicals. Conventional, publicly known conditions are suitably applicable as the aforementioned heating temperature and other conditions which are by no means limited in any particular manner.

The aforementioned chemical curing is a method of causing imidization to progress through the action of a chemical conversion agent and preferably catalyst on the polyamide acid solution.

Specific examples of the chemical conversion agent are not limited in any particular manner. Suitable examples includes, aliphatic anhydrides, aromatic anhydrides, N,N'-dialkyl carbodiimide, lower aliphatic halides, halogenated lower aliphatic halides, halogenated lower aliphatic anhydrides, aryl phosphonic acid dihalide, and thionyl halide, Any of the chemical conversion agents may be used singly; alternatively, two or more of them may be mixed for use as a mixture.

Especially preferred compounds among the chemical conversion agents are aliphatic anhydrides, such as acetic anhydride, propionic anhydride, and butyric anhydride. Any of the compounds may be used singly; alternatively, two or more of them may be mixed for use as a mixture as in previous cases.

The chemical conversion agents may be used in quantities which, although not being limited in any particular manner, are within a range of 0.5 mole equivalent to 5.0 mole equivalents, preferably within a suitable range of 0.8 equivalent to 4.0 mole equivalents, more preferably 1.0 equivalent to 3.0 mole equivalents, per every mole of the amide acid in the polyamide acid.

If the chemical conversion agents are used in quantities below those ranges, the imidization will likely slow down, and the productivity will likely fall; if they are used in quantities above the ranges, the resultant polyimide film will likely exhibit poorer mechanical properties or the imidization will likely occur too quickly, rendering the flow-casting on the base member difficult.

The catalyst is used in combination with a chemical conversion agent for efficient imidization. Specific examples of such a catalyst are not limited in any particular manner and include aliphatic tertiary amines, aromatic tertiary amines, heterocycic tertiary amines. Especially preferred among them are those compounds selected from heterocycic tertiary amines: namely, quinoline, isoquinoline, β-picoline, pyridine, etc.

The catalysts may be used in quantities which, although not being limited in any particular manner, are within a range of 0.1 equivalent to 2 mole equivalents, preferably within a suitable range of 0.2 equivalent to 1.5 mole equivalents, more preferably 0.3 equivalent to 1.0 mole equivalent, per every mole of the amide acid in the polyamide acid.

If the catalysts are used in quantities below those ranges (too little), the chemical imidization (hardening) will unlikely to progress; if they are used in quantities above the ranges (too much), the chemical imidization (hardening) may progress too quickly, rendering the flow-casting on the support body difficult.

The chemical curing and thermal curing methods may be used singly or in combination. Whether the methods are used singly or in combination, reaction conditions related to the imidization may vary depending on the type of the polyamide acid, the thickness of the gel film or polyimide film, the selection made between the thermal curing and/or chemical curing methods, etc. and are not limited in any particular manner.

The chemical curing and thermal curing methods are implemented also in the post-conductivity-imparting imidization step after the conductivity imparting step in which the gel film is provided with conductivity. While the post-conductivity-imparting imidization step completes the imidization to form a semiconducting polyimide film, the gel film formation step restrains the imidization to the extent to have a self-supporting property, so that the hardening does not proceeds further than an intermediate stage between the polyamide acid and the polyimide.

Accordingly, it is preferred if the gel film contains volatile components of which the quantity V, as given in percentage points by equation (1), is specified within a predetermined range:

$$V=(A-B)\times 100/\{B\times (100-C)\} \quad (1)$$

where A is the weight of the gel film, B is the weight of the gel film after it is heated at 450 degrees C. for 20 minutes, and C is the quantity (wt %) of the semiconducting inorganic filler in the gel film. The semiconducting inorganic filler will be described in detail later in relation to the conductivity imparting step. The weights A and B may be expressed in any unit, provided that they are expressed in the same unit (e.g. if A is expressed in grams, so does B.).

The quantity V of the contained volatile components may range from 5% to 500%, preferably from 5% to 100%, more preferably from 10% to 80%, most preferably from 30 to 60%. So long as the quantity V of the volatile components contained in the gel film stays within one of the ranges, the resultant semiconducting polyimide film will have desirable quality; if it falls outside the ranges, predetermined effects are difficult to achieve.

To impart predetermined effects to the resultant semiconducting polyimide film more surely, it is preferred if the imidization ratio of the gel film is also controlled.

The imidization ratio I is given in percentage points by equation (2):

$$I=(D/E)\times 100/(F/G) \quad (2)$$

where D and E are absorbance peaks of a gel film at 1370 $cm^{-1}$ and 1500 $cm^{-1}$ respectively, and F and G are absorbance peaks of the polyimide film at 1370 $cm^{-1}$ and 1500 $cm^{-1}$ respectively. Infrared radiation absorbance analysis is employed, and the gel film used in the measurement of the heights is one which contains no semiconducting inorganic filler or conductive-film-formation coating liquid (that is, a gel film formed from only a polyamide acid solution). The conductive-film-formation coating liquid will be described in detail later in relation to the conductivity imparting step, as will the semiconducting inorganic filler.

The imidization ratio I, although not being limited in any particular manner, is preferably 50% or greater, more preferably 80% or greater, further preferably 85% or greater, and most preferably 90% or greater; the upper limit is of course 100%. So long as the imidization ratio I of a gel film stays within one of those ranges, the resultant semiconducting polyimide film will have desirable quality; if it falls outside the ranges, predetermined effects are difficult to achieve.

In the present embodiment, the polyamide acid solution obtained in the polyamide acid solution preparation step is used as the film-forming solution without further processing or after subjecting the polyamide acid solution to later described addition of the semiconducting inorganic filler and the conductivity imparting agent. The film-forming solution is then cast in film on a flat-plate-shaped support body (base member). Thereafter, the solution is heated on the support body at a temperature in the predetermined range so as to partially harden and/or dry the polyamide acid. Next, the hardened and/or dried polyamide acid is peeled off the support body to obtain a gel film.

Specific examples of the support body are not limited in any particular manner and include a glass plate, aluminum foil, an endless stainless belt, and a stainless drum. The support body is not limited in size and other attributes in any particular manner. Conditions under which the film-forming solution is cast on the support body are not limited in any particular manner either.

Heating temperature in the partial hardening and/or drying of the polyamide acid is preferably within a range of 80 degrees C. to 200 degrees C., more preferably 100 degrees C. to 180 degrees C. Heating temperature outside the ranges will decrease productivity and develop foaming and other defects.

<Conductivity Imparting Step>

As mentioned in the foregoing, in the present invention, a conductivity imparting step is preformed on the polyamide acid solution or gel film. The conductivity imparting step is specifically a step of subjecting the polyamide acid solution and/or gel film to at least any one of the following processes: the adding of a semiconducting inorganic filler, the adding of a conductivity imparting agent, and the forming of a conductive film. Conductivity imparting by these methods will be now described in concrete terms.

<Addition of Semiconducting Inorganic Filler>

The aforementioned semiconducting inorganic filler (hereinafter, for convenience, will be simply referred to as "inorganic filler") used in the present invention is such a filler with a volume resistivity (powder resistance) ranging from $10^5$ to $10^9$ Ω·cm that is made by press-molding a dried inorganic filler at 100 kg/cm².

Conventionally used inorganic fillers are conductive fillers; particles covered with carbon or graphite; or the like; they have low resistance values, and the addition of even a small quantity of a filler will likely reduce the resistance. In contrast, the semiconducting inorganic filler used in the present invention, owing to the inclusion of the foregoing arrangement, has a resistance value in the semiconducting region. To reduce the resistance, it has to be added in a relatively large quantity. Put it differently, subtle adjustments of the resistance becomes possible by the addition of small quantities. It is therefore not only the surface resistance of the obtained polyimide film, but also the volume resistance that can be suitably controlled. Irregularities in the resistance can be also reduced, and its voltage dependence can be lowered.

The filler is not limited in any particular manner in terms of material from which it is made: preferred examples include titanium oxide, zinc oxide, iron oxide, calcium carbonate, iron hydroxide, and tin oxide. The most preferred among them is titanium oxide in view of heat resistance, resistance control, etc. of the obtained semiconducting polyimide film.

The inorganic filler is not limited in any particular manner in terms of shape: it may be spherical, layer-like, acicular, or power-like, to name a few choices. Inorganic fillers in these shapes can be used singly or in combination as a mixture. Preferred choices among them are an acicular inorganic filler used solo and an acicular inorganic filler used as a mixture with another inorganic filler of a different shape. Inclusion of at least an acicular inorganic filler is preferred in view of mechanical properties of the obtained semiconducting polyimide film.

Therefore, a particularly preferred inorganic filler in the present invention is an acicular one made of titanium oxide, that is, titanium oxide whiskers.

The more specific shape of the acicular inorganic filler is not limited in any particular manner: for example, the shorter axis may range from 0.01 μm to 1 μm, preferably from 0.05 μm to 0.75 μm, more preferably from 0.1 μm to 0.5 μm. The longer axis may range from 1 μm to 20 μm, preferably from 1.5 μm to 15 μm, more preferably from 2 μm to 10 μm.

Inorganic fillers with a shorter axis or a longer axis falling outside the ranges will make it difficult to produce a semiconducting polyimide film with a well-balanced resistance value and mechanical strength.

Non-acicular inorganic fillers may also be used so long as the average particle diameter stays within a range of 0.01 μm to 20 μm, preferably 0.01 μm to 15 μm, more preferably 0.01 μm to 10 μm.

If the particle diameter of the inorganic fillers is below those range (too small), the mechanical properties of the obtained semiconducting polyimide film will likely deteriorate; if it is above the ranges (too large), the control of the resistance value of the obtained semiconducting polyimide film will likely be difficult.

The inorganic fillers may be added in quantities which, although not limited in any particular manner, are within a range of 15 wt % to 50 wt %, preferably 15 wt % to 40 wt %, more preferably 20 wt % to 35 wt %, to the total weight of the semiconducting polyimide film.

In the present invention, conductivity may be imparted by other methods in the conductivity imparting step, rendering the addition of an inorganic filler not essential; another conductivity imparting method may be used together. In such cases, preferred quantities of the added inorganic filler(s) may be slightly different from the aforementioned quantities added.

For example, if both an inorganic filler and a conductivity imparting agent are added, the inorganic filler may be added in a smaller quantity (adding it in a large quantity would not do any harm). Therefore, if a conductivity imparting agent is added together, the inorganic filler is able to provide sufficient conductivity when added not less than about 10 wt %.

If the quantity of the inorganic filler added is below the foregoing ranges, the conductivity of the obtained semiconducting polyimide film will be unlikely to improve; if it is above the ranges, the volume and surface resistances of the obtained semiconducting polyimide film will likely saturate, and the elongation rate thereof will likely drop.

Specific methods of adding the semiconducting inorganic filler is not limited in any particular manner. Firstly, if the inorganic filler is added to a polyamide acid solution, the specific method of dispersing it in the polyamide acid solution is not limited in any particular manner: any method can be used singly or in combination with another conductivity imparting method.

Specifically, (i) Use as the polymerization solvent a slurry in which an inorganic filler is dispersed, and polymerize the polyamide acid. (ii) Add an inorganic filler or a slurry of an inorganic filler during the course of polymerization, so as to prepare a filler-dispersed polyamide acid solution. (iii) Mix a polyamide acid solution and a slurry of an inorganic filler immediately before flow-casting on a base member. Note that in method (i), the addition of an inorganic filler takes place at the same time as the polyamide acid solution preparation step, and a filler-dispersed polyamide acid solution is obtained when the polyamide acid solution preparation step finishes.

In the present embodiment, this aforementioned filler-dispersed polyamide acid solution as such can be used as a film-forming solution, if the aforementioned thermal curing method is used in a later post-conductivity-imparting imidization step. In cases where the chemical curing method is used, the film-forming solution may be prepared by adding to the filler-dispersed polyamide acid solution a hardening agent containing a chemical conversion agent and preferably a catalyst. Alternatively, the film-forming solution may be prepared by adding to the polyamide acid solution a slurry in which an inorganic filler is dispersed in the hardening agent.

Secondly, if the inorganic filler is added to a gel film, the specific method of adding the gel film is not limited in any particular manner: for example, an inorganic filler may be added to a gel film by applying to the gel film a filler dispersion liquid in which an inorganic filler is dispersed.

<Addition of Conductivity Imparting Agent>

Any conductivity imparting agent may be used in the present invention, so long as the agent is capable of providing conductivity to a hardened polyimide film. Examples include various metal oxides and their precursors. Specific examples of such metal oxides include zinc oxide doped with aluminum or boron, tin oxide, titanium oxide, indium oxide, zinc-indium oxide, tin antimony oxide, and indium tin oxide.

Any of the metal oxides may be used singly; alternatively, two or more of them may be used in a combination. The "metal oxides," when used as a conductivity imparting agent mixed with a polyamide acid, encompass their precursors. Any precursor may be used so long as it produces one of the foregoing metal oxides when prepared as a solution. Indium formate and tin formate (II) are examples of precursors for the metal oxide when the oxide is indium tin oxide.

In the conductivity imparting step of the present invention, it would be appropriate if the conductivity imparting agent is mixed in solution form with a polyamide acid solution.

Using a solution of a conductivity imparting agent in this manner enables a conductivity imparting agent and a polyamide acid to be mixed at the molecular level. Therefore, addition in a small quantity enables the volume and surface resistance values of the obtained semiconducting polyimide film to be readily controlled in the semiconducting region with high accuracy. In addition, the voltage dependence of the resistance values can be reduced, and irregularities in the in-plane resistance values of the polyimide film can also be reduced.

Especially, in the present invention, as the aforementioned precursor-containing solution, a solution per se (conductive-film-formation coating liquid) which is conventionally used to form a conductive metal oxide film can be used as a solution of a conductivity imparting agent. In other words, in the adding of a conductivity imparting agent, a conductive-film-formation coating liquid containing the aforementioned metal oxide may be used as a solution of a conductivity imparting agent and mixed with an organic solvent solution of a polyamide acid.

By the use of the aforementioned conductive-film-formation coating liquid as a solution of a conductivity imparting agent, not only the resistance value of the obtained semiconducting polyimide film is reduced, but also the voltage dependence of the resistance value can be lowered. Further, irregularities in the in-plane resistance value of the semiconducting polyimide film can be reduced.

Among the aforementioned conventional, publicly available conductive-film-formation coating liquids, those solutions which contain an indium tin oxide precursor (for convenience, "ITO precursor coating liquid") are preferred. ITO precursor coating liquids are widely used, easily available, and preferred for its cost. Specifically, for example, Tokukaihei 11-279437 and Tokukai 2000-207959 detailed above discloses coating liquids for indium tin oxide film formation which can be suitably used.

The solution of a conductivity imparting agent may be added in any quantity which is specified suitably according to the type of the conductivity imparting agent. For example, the ITO precursor coating liquid may be added in a quantity ranging from 1 weight part to 20 weight parts, preferably from 1.5 weight parts to 15 weight parts, more preferably from 2 weight parts to 10 weight parts as measured in terms of weight of the indium tin oxide, relative to the weight of the polyimide.

If the added quantity is too small, the obtained semiconducting polyimide film will unlikely show improvements in conductivity; if it is too large, the polyimide film will likely lose mechanical strength.

Further, in the present invention, as a conductive-film-formation coating liquid, the solutions of a metal oxide precursor disclosed in Japanese Unexamined Patent Applications 7-331450/1995 (Tokukaihei 7-331450; published on 19 Dec. 1995), 8-227614/1996 (Tokukaihei 8-227614; published on 3 Sep. 1996), 8-295513/1996 (Tokukaihei 8-295513; published on 12 Nov. 1996), and 9-286936/1997 (Tokukaihei 9-286936; published on 4 Nov. 1997) may be used as the solution of a conductivity imparting agent in accordance with the present invention.

The step of mixing the solution of a conductivity imparting agent (containing a conductive-film-formation coating liquid) with a polyamide acid solution is not limited in any particular manner. The step may be implemented at any stage similarly to the addition of an inorganic filler. For example, (I) use a solution of a conductivity imparting agent as a polymerization solvent for a polyamide acid, (II) mix a solution of a conductivity imparting agent during the course of polymerization of a polyamide acid, and (III) mix a solution of a conductivity imparting agent with a polyamide acid solution immediately before flow-casting on a support body. (III) is preferred to (I) and (II) in view of storage stability of the polyamide acid solution, because according to method (III), mixing takes place immediately before flow-casting on a support body.

Therefore, if the aforementioned thermal curing method is used in a later post-conductivity-imparting imidization step, the polyamide acid solution containing a solution of a conductivity imparting agent per se can be used as a film-forming solution. This is also true with those cases in which a conductivity imparting agent and an inorganic filler are both added. In other words, a polyamide acid solution containing an inorganic filler and a solution of a conductivity imparting agent per se can be used as a film-forming solution.

If the aforementioned chemical curing method is used in a later post-conductivity-imparting imidization step, the film-forming solution may be prepared by adding a hardening agent containing a chemical conversion agent and preferably a catalyst to the polyamide acid solution containing a solution of a conductivity imparting agent. Alternatively, the film-forming solution may be prepared by adding to a polyamide acid solution a liquid mixture of the hardening agent and a solution of a conductivity imparting agent.

Similarly, if both a conductivity imparting agent and an inorganic filler are to be added, the film-forming solution may be prepared by either adding a hardening agent containing a chemical conversion agent and preferably a catalyst to a polyamide acid solution containing the inorganic filler and a solution of the conductivity imparting agent or by mixing a hardening agent and a solution of a conductivity imparting agent and adding the mixture to a polyamide acid solution.

<Formation of Conductive Film>

The conductive film formed in the present invention is not limited in any particular manner so long as it is a conductive metal oxide film containing the metal oxide(s) listed previously in relation to the conductivity imparting agent. The conductive film is formed from a conductive-film-formation coating liquid in which that metal oxide or its precursor is dissolved or dispersed in an organic solvent.

The conductive-film-formation coating liquid may have a concentration which, although not limited in any particular manner, are within a range of 0.01 wt % to 15 wt %, preferably 0.05 wt % to 10 wt %, more preferably 0.1 wt % to 5 wt %.

If the concentration of the conductive-film-formation coating liquid is too low, the obtained semiconducting polyimide film will unlikely show improvements in conductivity; if it is too high, the polyimide film will likely lose mechanical strength.

In the semiconducting polyimide film, the concentration of the conductive-film-formation coating liquid is, to reduce voltage dependence of the resistance value, preferably within a range of 0.1 wt % to 15 wt %, more preferably 0.25 wt % to 10 wt %, and even more preferably 0.5 wt % to 5 wt %.

If the concentration of the conductive-film-formation coating liquid is below 0.1 wt %, voltage dependence, especially that of volume resistance value, will not be effectively reduced in the obtained semiconducting polyimide film; if it too high, the obtained semiconducting polyimide film will likely lose mechanical strength.

The solvent for the conductive-formation-film coating liquid is not limited in any particular manner and may be any conventional, publicly available substance. Preferred substances are amide solvents, i.e., N,N-dimethyl formamide, N,N-dimethylacetamide, and N-methyl-2-pyrolidone. Among them, N,N-dimethyl formamide and N,N-dimethylacetamide are especially preferred both singly and in combination as a mixture at any given ratio.

The conductive-film-formation coating liquid may be conventional, publicly available one and is not limited in any particular manner, as described in relation to the addition of the conductivity imparting agent. Specifically, for example, indium tin oxide film formation coating liquid, etc. disclosed in Tokukaihei 11-279437 and Tokukai 2000-207959 above are particularly preferred.

By processing a gel film using the conductive-film-formation coating liquid, that is, forming a conductive film on a gel film, conductivity will be provided to the ultimately obtained polyimide film to render the film a semiconducting polyimide film. Also, as mentioned in the foregoing, the voltage dependence of the resistance of the obtained semiconducting polyimide film can be reduced. The gel film on which a conductive film is formed may be either a gel film to which an inorganic filler is added or that to which no inorganic filler is added.

The method of processing the gel film using the conductive-film-formation coating liquid may be any method and is not limited in any particular manner, so long as the method is capable of forming the conductive film on the gel film. Any conventional, publicly available method can be employed. Specifically, a method of coating the gel film with a conductive-film-formation coating liquid and a method of immersing the gel film in a conductive-film-formation coating liquid can be used.

The coating method can be one of various conventional, publicly available methods and is not limited in any particular manner. Examples of such coating methods include gravure coating, spray coating, and knife coating. Among them, the gravure coater is preferably used in view of control of coating quantity and uniformity.

The conductive-film-formation coating liquid may be applied in a quantity which, although not being limited in any particular manner, is preferably 1 g/m$^2$ or greater, more preferably 5 g/m$^2$ or greater. If the quantity is below the ranges, the liquid will improve electrical properties of the obtained semiconducting polyimide film less effectively.

The immersion method is not limited in any particular manner and can be any typical dip coating method. Specifically, the gel film is immersed continuously or intermittently the conductive-film-formation coating liquid in a bath. The film may be immersed for a time which, although not being limited in any particular manner, is normally preferably 1 second or longer. If the film is immersed shorter than 1 second, the volume resistance value does not effectively improve. The immersion action is repeated at least twice to adjust the resistance value of the obtained semiconducting polyimide film to a desired value.

In the formation of the aforementioned conductive film, these coating and immersion methods may be carried out singly or in combination. Especially preferred to control and improve the resistance and electrical properties of the obtained semiconducting polyimide film is combined use of the coating and immersion methods.

Further, in the present embodiment, after processing a conductive-film-formation coating liquid in relation to gel film (immersing and/or coating), an additional action is desirable to remove excess liquid drops on the gel film surface. The additional action enables a conductive film to be formed uniformly on the gel film surface and makes an excellent appearance for the semiconducting polyimide film.

Liquid drops may be removed by a method which, not limited in any particular manner, can suitably be one of various conventional, publicly available methods. Specific examples of such methods include liquid squeezing using nip rollers, air knife, doctor blade, wipe-off, and suction. Among them, liquid squeezing using nip rollers is especially preferred in terms of film appearance, dryness, workability, etc.

<Variations in Conductivity Imparting Step>

As mentioned earlier, in the conductivity imparting step, the conductivity imparting methods may be used singly or in combination. The following will describe specific variations of those methods.

The conductivity imparting step may be carried out at any timing, including as a preceding step of the gel film formation step, that is, at the same time as the polyamide acid solution preparation step or after the polyamide acid solution preparation step, or as a succeeding step of the gel film formation step. Also, the conductivity imparting step may be carried out after any one of these steps. If carried out at the same time as the polyamide acid solution preparation step, the inorganic filler and/or the conductivity imparting agent is added at the same time as the polyamide acid solution is prepared; the inorganic filler and/or the conductivity imparting agent is added to the polyamide acid solution after the polyamide acid solution preparation step; and the inorganic filler added (for example, the filler dispersion liquid is applied) and/or the conductive film is formed after the gel film formation step.

Here, as mentioned in the foregoing, since the same conductive-film-formation coating liquid can be used for the addition of the conductivity imparting agent and the formation of the conductive film, specific variations of the conductivity imparting can be summarized as in (A) to (C):

(A) The conductivity imparting step is carried out at the same time as, or only after, the polyamide acid solution preparation step.

To the polyamide acid solution (during the course of, or after, preparation), (A-1) the inorganic filler is added, (A-2) the conductive-film-formation coating liquid is added, or (A-3) the inorganic filler and the conductive-film-formation coating liquid are added.

(B) The conductivity imparting step is carried out only after the gel film formation step.

To the gel film, (B-1) the inorganic filler is added (the filler dispersion liquid is applied), (B-2) the conductive-film-formation coating liquid is applied, or (B-3) the filler dispersion liquid and the conductive-film-formation coating liquid are applied.

(C) The conductivity imparting step is carried out after the polyimide acid solution preparation step and the gel film formation step.

(C-1) Only the inorganic filler is added to the polyamide acid solution.

After the inorganic filler is added to the polyamide acid solution, to the obtained gel film, (C-1-1) the inorganic filler is added (the filler dispersion liquid is applied), (C-1-2) the conductive-film-formation coating liquid is applied, or (C-1-3) the filler dispersion liquid and the conductive-film-formation coating liquid are applied.

(C-2) Only the conductive-film-formation coating liquid is added to the polyamide acid solution.

After the conductive-film-formation coating liquid is added to the polyamide acid solution, to the obtained gel film, (C-2-1) the inorganic filler is added (the filler dispersion liquid is applied), (C-2-2) the conductive-film-formation coating liquid is applied, or (C-2-3) the filler dispersion liquid and the conductive-film-formation coating liquid are applied.

(C-3) The inorganic filler and the conductive-film-formation coating liquid are added to the polyamide acid solution.

After the inorganic filler and the conductive-film-formation coating liquid are added to the polyamide acid solution, to the obtained gel film, (C-3-1) the inorganic filler is added (the filler dispersion liquid applied), (C-3-2) the conductivefilm-formation coating liquid is applied, or (C-3-3) the filler dispersion liquid and the conductive-film-formation coating liquid are applied.

In the present invention, specific methods of imparting conductivity are not limited in any particular manner. For example, in the conductivity imparting step, any one of methods in (A) to (C) above may be used. Alternatively, two or more methods may be used in combination.

<Post-Conductivity-Imparting Imidization Step>

As mentioned in relation to the gel film formation step, a partially hardened and/or dried gel film is obtained by casting the aforementioned film-forming solution on a support body in a film form, heating the solution on the support body at a temperature between 80 degrees C. and 200 degrees C., and peeling it off the support body. The gel film is an intermediate stage of hardening from the polyamide acid to the polyimide.

As described in relation to the conductivity imparting step, conductivity is provided to the gel film before or after its formation or at another time, by at least one of the methods of adding the inorganic filler, adding the conductivity imparting agent, and forming a conductive film. The gel film at this stage is either (a) that which contains the inorganic filler and/or the conductivity imparting agent, (b) that which has the conductive film formed on the surface, (c) that which contains the inorganic filler and/or the conductivity imparting agent and which also has the conductive film formed on the surface, and the polyamide acid is not completely imidized (hardened).

Accordingly, in the post-conductivity-imparting imidization step, the gel film (a) to (c) to which conductivity is imparted is imidized. Specific methods of the imidization may be suitably the thermal and chemical curing methods described in relation to the gel film formation step.

Here, in the post-conductivity-imparting imidization step, to prevent contraction due to imidization, it is preferred if the gel film is fixed at its ends. After thus fixing the ends, the gel film is dried, water, remnants of the solvent and conversion agent, catalyst, etc. are removed to completely imidize the remaining amide acid. By so doing, a semiconducting polyimide film in accordance with the present invention is obtained.

Here, it is preferred it the heating in the post-conductivity-imparting imidization step is ultimately conducted at a temperature in a range from 400 degrees C. to 580 degrees C., preferably 450 degrees C. to 550 degrees C., and for a time in a range from 1 second to 500 seconds, preferably 15 seconds to 400 seconds.

In the heating, if either the temperature or the time is above the ranges, the gel film possibly deteriorates due to heat, and the obtained semiconducting polyimide film possibly show poorer mechanical properties. In contrast, if the temperature or the time is below the ranges, hydrolysis resistance and other chemical properties possibly deteriorate.

<Physical Properties of Semiconducting Polyimide Film>

The semiconducting polyimide film in accordance with the present invention produced in this manner is given conductivity before it completely hardens, and therefore is not only given excellent electrical properties, but also allows control of the electrical properties by varying manufacturing conditions. Consequently, excellent properties are realized: the mechanical properties and elongation rate of the obtained semiconducting polyimide film are enhanced. Also, the surface resistance and volume resistance of the polyimide film is precisely controlled and the voltage dependence of the resistance values can be reduced.

Describing specific properties of the semiconducting polyimide film in accordance with the present invention, the film has a resistance value in the semiconducting region, and at least, among the electrical properties, the surface resistance is in a range from $10^8$ Ω/☐ to $10^{13}$ Ω/☐ and the volume resistance is in a range from $10^8$ Ωcm to $10^{14}$ Ωcm, as measured at an applied voltage of 100 V. In addition, the resistance values show reduced voltage dependence. Especially, by adding the inorganic filler in the conductivity imparting step, the elongation rate and the mechanical properties can be enhanced.

An example of a set of obtainable properties of the semiconducting polyimide film in accordance with the present invention will be now described for each conductivity imparting step. Resistance values (surface resistance values and volume resistance values), elongation rates, and other various mechanical properties are measured by conventional, publicly available, general methods which are not limited in any particular manner.

In the conductivity imparting step, if the inorganic filler is added, the obtained semiconducting polyimide film can be rendered to have a surface resistance between $10^{10}$ Ω/☐ and $10^{13}$ Ω/☐ and a volume resistance between $10^{10}$ Ωcm and $10^{14}$ Ωcm as measured at an applied voltage of 100 V. It is preferred if the semiconducting polyimide film contains a 15 wt % to 50 wt % inorganic filler. In other words, it is preferred if the semiconducting polyimide film is such that the weight ratio of the polyimide and the semiconducting inorganic filler is from 85:15 to 50:50.

In the conductivity imparting step, if the conductivity imparting agent is added, the obtained semiconducting polyimide film can be rendered to have a surface resistance between $10^8$ Ω/☐ and $10^{12}$ Ω/☐ and a volume resistance between $10^8$ Ωcm and $10^{13}$ Ωcm as measured at an applied voltage of 100 V.

In the conductivity imparting step, if the conductive film is formed, the obtained semiconducting polyimide film can be rendered to have a surface resistance between $10^8$ Ω/☐ and $10^{12}$ Ω/☐ and a volume resistance between $10^8$ Ωcm and $10^{13}$ Ωcm as measured at an applied voltage of 100 V.

In the conductivity imparting step, the addition of the inorganic filler can be used in combination with either the addition of the conductivity imparting agent or the formation of the conductive film. When this is the case, it is preferred if the quantity of the inorganic filler contained in the semiconducting polyimide film is in a range of 15 wt % to 50 wt %.

At least, if the inorganic filler is added in the conductivity imparting step, the obtained semiconducting polyimide film will have an elongation rate and mechanical properties as follows.

First, the semiconducting polyimide film has a tensile elongation (elongation rate) no less than 40%, 45%, or 50%.

The semiconducting polyimide film has, among mechanical properties, a tensile modulus no less than 1.1 times, 1.3 times, or 1.6 times that of a semiconducting polyimide film containing no filler.

Similarly, the semiconducting polyimide film has, among mechanical properties, a tear strength no less than 1.1 times, 1.2 times, or 1.3 times that of a semiconducting polyimide film containing no filler or no less than 400 g/mm, 500 g/mm, or 600 g/mm in absolute values.

EXAMPLES

Next, the present invention will be describe in more detail by way of examples and comparative examples, which by no means restricts the present invention and allows a person skilled in the art to vary, modify, and otherwise change without departing from the scope of the present invention. The examples and comparative examples are arranged according to the imparting conductivity methods in the conductivity imparting step. Properties of the polyimide film are measured as follows:

[Surface Resistance Value and Volume Resistance Value]

The surface resistance and the volume resistance of the semiconducting polyimide film were measured by leaving all samples in the same environment as measurements would be taken for 48 hours, controlling humidity, using an R8340 Ultra High Resistance Meter made by Advantest Corporation, discharging for 30 seconds, applying a voltage of 100 V, and taking current readings 30 seconds later after the voltage application.

[In-Plane Irregularities of Resistance Value]

The resistance was measured at 100 V, and then the difference between a maximum and a minimum was calculated as an in-plane irregularity (In-plane Irregularity=Maximum−Minimum).

[Tear Propagation Strength and Tensile Strength]

The tear propagation strength and the tensile strength of the obtained polyimide film was measured according to ASTM D-1938 and JISC-2318 respectively.

<Addition of Inorganic Filler>

Example 1

A slurry of 6.4 g of an acicular titanium oxide filler (5.155 μm in fiber length and 0.27 μm in fiber diameter available from Ishiharasangyou Co. Ltd. under the product number FTL-300; particulate resistance $10^8$ Ω·cm) and 28 g of DMF was added and mixed with 100 g of a 18.5 wt % solution of a polyamide acid in DMF which had been synthesized from pyromellitic dianhydride and 4,4'-diaminodiphenylether at a 1:1 molar ratio.

Next, a hardening agent composed of 9 g of acetic anhydride, 11.4 g of isoquinoline, and 15.6 g of DMF was mixed with this filler-dispersed polyamide acid varnish and agitated. After removing foams by centrifugaration, the mixture was flow-cast applied onto aluminum foil. The operation from agitation to foam removal was carried out while keeping the sample at 0 degree C. or lower.

The stack body of the aluminum foil and the polyamide acid solution was heated at 140 degrees C. for 250 seconds to obtain a gel film with a self-supporting property, which was then peeled off the aluminum foil and secured to a frame.

The gel film was heated at 200 degrees C., 300 degrees C., 400 degrees C., and 450 degrees C. for 1 minute for each temperature to produce a 75 μm thick semiconducting polyimide film (containing a 28.6 wt % filler). Table 1 shows some properties of the semiconducting polyimide film.

Example 2

A 75 μm thick semiconducting polyimide film (containing a 37.5 wt % filler) was obtained by exactly the same process as in example 1, except that 9.6 g of the acicular titanium oxide filler (FTL-300 described above; particulate resistance $10^8$ Ω·cm) was used. Table 1 shows some properties of the semiconducting polyimide film.

Reference Example

A 75 μm thick polyimide film containing no filler was obtained by exactly the same process as in example 1, except that the slurry of titanium oxide and DMF was not used. Table 1 shows some properties of the polyimide film.

Comparative Example 1

A 75 μm thick polyimide film (containing a 28.6% filler) was obtained by exactly the same process as in example 1, except that a slurry of 6.4 g of acicular titanium oxide coated with indium tin oxide (2.86 μm in fiber length and 0.21 μm in fiber diameter available from Ishiharasangyou Co. Ltd. under the product number FT-2000; particulate resistance 10 Ω·cm) and 28 g of DMF was used. Table 1 shows some properties of the polyimide film.

Comparative Example 2

A 75 μm thick polyimide film (containing a 23.1% filler) was obtained by exactly the same process as in example 1, except that a slurry of 4.8 g of acicular titanium oxide coated with indium tin oxide (FT-2000 described above; particulate resistance 10 Ω·cm) and 28 g of DMF was used. Table 1 shows some properties of the polyimide film.

Comparative Example 3

A 75 μm thick polyimide film (containing a 28.6% filler) was obtained by exactly the same process as in example 1, except that a slurry of 4.8 g of acicular titanium oxide coated with indium tin oxide (FT-2000 described above; particulate resistance 10 Ω·cm), 2.4 g of spherical titanium oxide coated with indium tin oxide, and 28 g of DMF was used. Table 1 shows some properties of the polyimide film.

Comparative Example 4

It was attempted to produce a polyimide film by exactly the same process as in example 1, except that a slurry of 6.4 g of spherical titanium oxide coated with indium tin oxide (0.3 μm in average particle diameter available from Ishiharasangyou Co. Ltd., ET-600W; particulate resistance 30 Ω·cm) and 28 g of DMF was used. However, the film showed poor mechanical strength and tore apart during the course of 400 degrees C. baking where it is fixed to a frame. A smooth polyimide film could not obtained.

TABLE 1

|  | Surface Resistance (log Ω/□) | | Volume Resistance (log Ω cm) | | Tensile Test | | Tearing |
| --- | --- | --- | --- | --- | --- | --- | --- |
|  | Applied Voltage 100 V | Applied Voltage 500 V | Applied Voltage 100 V | Applied Voltage 500 V | Elasticity (GPa) | Elongation (%) | Test (g/cm) |
| Example 1 | 12.9 | 12.8 | 12.8 | 12.3 | 5.38 | 63 | 646 |
| Example 2 | 11.2 | 11.1 | 11.0 | 10.7 | 5.83 | 56 | 660 |
| Reference Example | 16.3 | 15.9 | 16.7 | 16.2 | 2.92 | 70 | 450 |
| Comparative Example 1 | 7.1 | <7 | 9.1 | <8 | — | — | — |

TABLE 1-continued

| | Surface Resistance (log Ω/□) | | Volume Resistance (log Ω cm) | | Tensile Test | | Tearing Test (g/cm) |
|---|---|---|---|---|---|---|---|
| | Applied Voltage 100 V | Applied Voltage 500 V | Applied Voltage 100 V | Applied Voltage 500 V | Elasticity (GPa) | Elongation (%) | |
| Comparative Example 2 | 13.8 | 13.5 | 14.4 | 9.5 | — | — | — |
| Comparative Example 3 | 13.8 | — | 14.4 | — | 3.01 | 25 | 400 |
| Comparative Example 4 | No sooth polyimide film was obtainable. | | | | | | |

As can be seen clearly from Table 1, the semiconducting polyimide film obtained in the present invention has a resistance which is little dependent on measured voltage, a surface resistance and a volume resistance which are readily and precisely controllable, and an excellent mechanical strength.

<Addition of Conductivity Imparting Agent>

In examples 3 to 5 below, conductivity is provided by both the addition of an inorganic filler and the addition of a conductivity imparting agent.

Example of Preparation of Conductivity Imparting Agent

Indium formate and tin formate (II) were dissolved in N,N,-dimethyl formamide f so that the indium and the tin formate have elements at a ratio of 90:10, thereby preparing a total of 1 wt % (concentration measured in terms of indium tin oxide) of indium-tin-oxide-film-forming coating liquid (for convenience, a "ITO-film-forming coating liquid"). The ITO-film-forming coating liquid was used as a solution of a conductivity imparting agent.

Example 3

A gel film was obtained by exactly the same process as in example 1, except that 4.8 g of the acicular titanium oxide filler (FTL-300 described above; particulate resistance $10^8$ Ω·cm) was used. The gel film contained 43% volatile components.

The gel film was peeled off the aluminum foil, immersed in the ITO-film-forming coating liquid obtained in the preparation example, rid of excess drops by passing it between nip rollers, and fixed to a frame.

The gel film was heated at 200 degrees C., 300 degrees C., 400 degrees C., and 450 degrees C. for 1 minute for each temperature, so as to produce a 75 μm thick semiconducting polyimide film (containing a 28.6 wt % filler). Table 2 shows some properties of the semiconducting polyimide film.

Note that in this example, the imidization ratio of the gel film obtained by not adding only the inorganic filler was 92%.

Example 4

A 75 μm thick semiconducting polyimide film (containing a 37.5 wt % filler) was obtained by exactly the same process as in example 3, except that 9.6 g of the acicular titanium oxide filler (FTL-300 described above; particulate resistance $10^8$ Ω·cm) was used. The gel film contained 39% volatile components. Table 2 shows some properties of the semiconducting polyimide film.

Note that in this example, the imidization ratio of the gel film obtained by not adding only the inorganic filler was 92%.

Example 5

A gel film was obtained by the same process as in example 4 using the inorganic filler (FTL-300 described above; particulate resistance $10^8$ Ω·cm). The gel film was immersed in the ITO-film-forming coating liquid obtained in the preparation example and rid of excess drops by passing it between nip rollers. Thereafter, the ITO-forming coating liquid was further spray coated on the gel film at a rate of 10 g/m².

The gel film was fixed to a frame and heated under the same conditions as in example 3 to obtain a semiconducting polyimide film. Table 2 shows some properties of the polyimide film.

Note that in this example, the imidization ratio of the gel film obtained by not adding only the inorganic filler was 92%.

Comparative Example 5

A polyimide film was obtained by exactly the same process as in example 1, except that the immersion in the ITO-film-forming coating liquid was skipped. Table 2 shows some properties of the polyimide film.

TABLE 2

| | Surface Resistance (logΩ/□) | | | Volume Resistance (logΩ cm) | | |
|---|---|---|---|---|---|---|
| | Applied Voltage 100 V | Applied Voltage 1000 V | In-plane Irregularity | Applied Voltage 100 V | Applied Voltage 1000 V | In-plane Irregularity |
| Example 3 | 11.2 | 10.5 | 0.5 | 11.5 | 11.1 | 0.5 |
| Example 4 | 10.5 | 10.0 | 0.4 | 10.2 | 9.9 | 0.3 |
| Example 5 | 9.2 | 8.6 | 0.6 | 11.0 | 10.4 | 0.4 |
| Comparative Example 5 | 13.5 | 10.9 | 1.0 | 13.8 | 10.8 | 0.9 |

As can be clearly seen from Table 2, the semiconducting polyimide film obtained in the present invention has such volume and surface resistance values in the semiconducting region that are precisely and readily controllable, that are little dependent on voltage, and that have reduced in-plane irregularities.

<Formation of Conductive Film>

In example 6 below, conductivity was provided by both the addition of an inorganic filler and the formation of a conductive film. The ITO-film-forming coating liquid prepared in the preparation example of a conductivity imparting agent was used as a conductive-film-formation coating liquid.

Example 6

A slurry of 3.5 g of the acicular titanium oxide filler (FTL-300 described above; particulate resistance $10^8$ Ω·cm) and 28 g of DMF and 34 g of the ITO-film-forming coating liquid (polyimide:indium tin oxide=100:2) prepared by the preparation example were added and mixed with 100 g of a 18.5 wt % solution of a polyamide acid in DMF which had been synthesized from pyromellitic dianhydride and 4,4'-diaminodiphenylether at a 1:1 molar ratio.

Thereafter, a gel film was obtained by exactly the same process as in example 1. The gel film contained 43% volatile components. The gel film was peeled off the aluminum foil and fixed to a frame.

The gel film was heated at 200 degrees C., 300 degrees C., 400 degrees C., and 450 degrees C. for 1 minute for each temperature to produce a 75 μm thick semiconducting polyimide film (containing a 17 wt % filler). Table 3 shows some properties of the semiconducting polyimide film.

Note that in this example, the imidization ratio of the gel film obtained by adding no inorganic filler and no ITO-film-forming coating liquid was 92%.

Comparative Example 6

A polyimide film was obtained by exactly the same process as example 6, except that the ITO-film-forming coating liquid was not added. Table 3 shows some properties of the polyimide film.

TABLE 3

| | | Voltage Measurement | | In-plane |
| | | 100 V | 1000 V | Irregularity |
|---|---|---|---|---|
| Example 6 | Volume Resistance (logΩ cm) | 12.5 | 12.0 | 0.5 |
| | Surface Resistance (logΩ/□) | 11.2 | 10.9 | 0.4 |
| Comparative Example 6 | Volume Resistance (logΩ cm) | 15.8 | 14.2 | 2.1 |
| | Surface Resistance (logΩ/□) | 14.2 | 13.5 | 1.8 |

As can be clearly seen from Table 3, the semiconducting polyimide film obtained in the present invention has such volume and surface resistance values in the semiconducting region that are precisely and readily controllable, that are little dependence on voltage, and that have reduced in-plane irregularities.

As detailed so far, the semiconducting polyimide film in accordance with the present invention is a polyimide film containing, as essential components, a polyimide and a semiconducting inorganic filler at a 85:15 to 50:50 weight ratio (in other words, the semiconducting inorganic filler accounts for 15-50 wt %) and has a surface resistance between $10^{10}$ Ω/□ and $10^{13}$ Ω/□ and a volume resistance between $10^{10}$ Ωcm and $10^{14}$ Ωcm as measured at an applied voltage of 100 V.

Preferably, the semiconducting polyimide film has a tensile elongation no less than 40% and a tensile modulus and a tear propagation strength both at least 1.1 times those of the polyimide film containing no such a semiconducting inorganic filler. Further, preferably, the semiconducting inorganic filler is acicular and is made of titanium oxide.

The method of manufacturing a semiconducting polyimide film in accordance with the present invention is either a method which involves a manufacturing process including: preparation of a solution of a semiconducting inorganic filler in a polyamide acid through polymerization in a slurry in which the semiconducting inorganic filler is uniformly dispersed; and flow-casting of a film-forming solution containing that solution and consequent formation of a film on a base member; and thermal or chemical imidization of the film, or a manufacturing process including or a method which involves; mixing of a solution of a polyamide acid and a slurry in which a semiconducting inorganic filler is uniformly dispersed; flow-casting of the liquid mixture on a base member and consequent formation of a film; and thermal or chemical imidization of the film.

According to the present invention, a semiconducting polyimide film can be manufactured which has such a resistance value in the semiconducting region that is little dependent on measurement voltage and which has surface and volume resistance precisely and readily controllable, and which has an excellent mechanical strength.

Further, as detailed in the above, a method of manufacturing a semiconducting polyimide film in accordance with the present invention may be a method involving immersing and/or applying a partially hardened and/or partially dried gel film in a conductive-metal-oxide-film-forming coating liquid, imidizing the remaining of the amide acid, and drying the film.

The semiconducting polyimide film in accordance with the present invention obtained by the manufacturing method has a surface resistance between $10^8$ Ω/□ and $10^{12}$ Ω/□ and a volume resistance between $10^8$ Ωcm and $10^{13}$ Ωcm as measured at an applied voltage of 100 V.

Alternatively, as detailed in the above, the method of manufacturing a semiconducting polyimide film in accordance with the present invention may be a method involving flow-casting a film-forming solution containing an organic solvent solution of a polyamide acid and a conductive metal-oxide-film-formation coating liquid on a support body, imidizing it, and drying it.

The semiconducting polyimide film in accordance with the present invention obtained by the manufacturing method has a surface resistance between $10^8$ Ω/□ and $10^{12}$ Ω/□ and a volume resistance between $10^8$ Ωcm and $10^{13}$ Ωcm as measured at an applied voltage of 100 V.

In any of the aforementioned methods, the coating liquid for use in the forming of a conductive metal oxide film is preferably a solution or dispersion liquid of indium tin oxide, and the gel film or film-forming solution preferably contains a 15 wt % to 50 wt % inorganic filler in the completely hardened polyimide film. The semiconducting inorganic filler is preferably titanium oxide whiskers.

According to the present invention, the volume and surface resistance values are precisely and readily controllable in the semiconducting region. In addition, the obtained semiconducting polyimide film has resistance which is less dependent on voltage and in-plane resistance with fewer irregularities.

The embodiments and examples described in Best Mode for Carrying Out the Invention are for illustrative purposes only and by no means limit the scope of the present invention. Variations are not to be regarded as a departure from the spirit and scope of the invention, and all such modifications as would be obvious to one skilled in the art are intended to be included within the scope of the claims below.

INDUSTRIAL APPLICABILITY

As detailed so far, the present invention offers polyimide film which has surface resistance and volume resistance satisfactorily controllable and less dependence on voltage, excellent mechanical properties, and a high elongation rate. Consequently, the present invention has applications in not only in the chemical industry manufacturing polyimide film, but also in electric and electronic industries utilizing semiconducting polyimide film, and machine industries as well.

What is claimed is:

1. A method of manufacturing a semiconducting polyimide film, comprising:
   a conductivity imparting step of adding a semiconducting inorganic filler to a polyamide acid solution which is a solution of an organic solvent containing polyamide acid;
   a gel film mold step of, following the conductivity imparting step, partially hardening and/or partially drying the polyamide acid to mold a gel film; and
   a post-conductivity-imparting imidization step of imidizing the polyamide acid contained in the gel film,
   wherein
   the semiconducting inorganic filler has a volume resistivity (powder resistance) of $10^5$ to $10^9$ $\Omega$cm, and
   the semiconducting inorganic filler is acicular and a shorter axis of the semiconducting inorganic filler falls within a range between 0.01 μm and 1 μm, while a longer axis of the semiconducting inorganic filler falls within a range between 1 μm and 20 μm, and
   the polyamide acid is made of at least one kind of diamine selected from 4,4' diaminodiphenylpropane, 4,4'-diaminodiphenylmethane, benzidine, 3,3'-dichorobenzidine, 4,4'-diaminodiphenylsulfide, 3,3'-diaminodiphenylsulfone, 4,4'-diaminodiphenylsulfone, 4,4'-diaminodiphenylether, 3,3'-diaminodiphenylether, 3,4'-diaminodiphenylether, 1,5-diaminonaphthalene, 4,4'-diaminodiphenyldiethylsilane, 4,4'-diaminodiphenylsilane, 4,4'-diaminodiphenylethyl phosphine oxide, 4,4'-diaminodiphenyl N-methylamine, 4,4'-diaminodiphenyl N-phenylamine, 1,4-diaminobenzene(p-phenylene diamine), and 1,2-diaminobenzene, and
   the imidization is performed at a heat treatment temperature range of 450° C. to 550° C. in the post-conductivity-imparting imidization step.

2. The method as set forth in claim 1, comprising the steps of:
   preparing the polyamide acid solution containing the semiconducting inorganic filler by polymerization in a slurry in which the semiconducting inorganic filler is uniformly dispersed, so that the semiconducting inorganic filler makes up of 15 wt % to 50 wt % of the semiconducting polyimide film as a final product; and
   forming a film by flow-casting a film-forming solution containing the polyamide acid solution on a support body.

3. The method as set forth in claim 1, comprising the steps of:
   mixing the polyamide acid solution and a slurry in which the semiconducting inorganic filler is uniformly dispersed, so that the semiconducting inorganic filler makes up of 15 wt % to 50 wt % of the semiconducting polyimide film as a final product; and
   forming a film by flow-casting a liquid mixture prepared in step 1 on a support body.

4. The method as set forth in claim 1, wherein the semiconducting inorganic filler is titanium oxide whiskers.

5. The method as set forth in claim 2, wherein
   the diamine is at least one kind selected from 4,4'-diaminodiphenylether and p-phenylene diamine.

6. The method as set forth in claim 1, wherein
   the polyamide acid is made of at least one kind of aromatic dianhydride selected from pyromellitic dianhydride, 2,3,6,7-naphthalene tetracarboxylic dianhydride, 3,3',4,4'-biphenyl tetracarboxylic dianhydride, 1,2,5,6-naphthalene tetracarboxylic dianhydride, 2,2',3,3'-biphenyl tetracarboxylic dianhydride, 3,3'4,4'-benzophenone tetracarboxylic dianhydride, 2,2-bis(3,4-dicarboxyphenyl)propane dianhydride, 3,4,9,10-perylene tetracarboxylic dianhydride, bis(3,4-dicarboxyphenyl)proane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfone dianhydride, p-phenylene bis(trimellitic monoesteric anhydride), ethylene bis(trimellitic monoesteric anhydride), and bisphenol A bis(trimellitic monoesteric anhydride).

7. The method as set forth in claim 6, wherein
   the aromatic dianhydride is at least one kind selected from pyromellitic dianhydride, 3,3',4,4'-benzophenone tetracarboxylic dianhydride, 3,3'4,4'-biphenyl tetracarboxylic dianhydride, and p-phenylene bis(trimellitic monoesteric anhydride).

* * * * *